Patented Sept. 1, 1936

2,053,244

UNITED STATES PATENT OFFICE 2,053,244

COMPOSITE ARTICLE CARRYING A CELLULAR BACKING OF PORCELAIN ENAMEL AND METHOD OF MAKING SAME

Karl Turk, Riderwood, Md.

Application December 28, 1935, Serial No. 56,565

18 Claims. (Cl. 91—73)

The present invention relates to the production of a composite article having a base provided with a cellular backing member, produced by fusion and subsequent cooling. The vitrified or semi-vitrified cellular backing is preferably applied to a shaped form, plate, or sheet of relatively high heat-conductivity characteristics.

One field wherein the basic principle of the present invention may be applied is in the insulating art. In the building field, there is a well defined trend to finish the exterior and the interior of building walls with metal forms of various structural shapes, but preferably in sheet form, and such metal building elements frequently carry a vitreous, porcelain enameled, or glass-like coating. However, all metals or alloys have quite a high heat-conductivity as compared to brick or tile, and this has hindered the utilization of structural metal forms in building construction. While it is true that glass, porcelain enamels, and ceramic materials have low heat-conductivity characteristics, a metal element coated with such a material does not adequately insulate, and it is still necessary to make special provisions to insulate buildings having exterior walls finished with metal, or else the cost of heating such buildings in winter is prohibitive and in summer they become unbearably hot.

Various means for providing the necessary insulation have been tried, such as making a hollow section and filling it with a suitable material or by fastening onto the frame, with the aid of a suitable adhesive, or with the aid of pins and lugs welded or riveted onto the back of the metal sheet, an insulating material, often in block form. Sometimes the enamel sheet is backed with a hydraulic cement or the like. Insulated metals of this character have a serious defect, in that it is exceedingly difficult to maintain a permanent adhesion or bond between the metal sides of the porcelain enamel sheet and the insulating material.

The present invention has overcome this defect by combining the well known adhering qualities of porcelain enamel to sheet metal, preferably sheet steel with an insulating backing, similar in composition to and integral with the porcelain enamel coating, thus eliminating the need for pins, lugs, cements and other fasteners. Further, my insulating material, due to its composition, has a coefficient of thermal expansion which is substantially the same as that of the metal face, thereby giving it much stronger adhesion to the metal face during the continuous expansion and contraction incident to its practical use. Similar adherence is not possible with bloated clays, plasters and other insulating materials, possessing widely different coefficients of expansion than the metal face to which they are secured.

The invention will be set forth by reference to the accompanying drawings, wherein.

According to the present invention, there is provided a composite article having a base to which there is permanently united a cellular backing, and more particularly a cellular vitreous or ceramic backing produced by a fusion or vitrification process. Such a composite article may have many uses, and it is to be understood that the article is to be used wherever it is suitable. However, the present invention is of particular value in the insulating art, and it will, therefore, be specifically disclosed in connection therewith.

The process by which the insulating article is produced comprises applying to a base, material adapted to produce a vitreous or semi-vitreous backing, said material having incorporated therein a gas producing agent, firing the so-treated article under such conditions as to fuse or vitrify, or semi-fuse or semi-vitrify said material, and trap the gases evolving from the gas-producing agent, and then cooling the article, the vitreous material forming on the base a cellular insulating backing, which is fused to the base. While various materials for producing the vitreous cellular backing may be used, the preferred material is a porcelain enamel frit or a mixture, which will form a porcelain enamel.

Broadly stated, the metal sheet which may have on one side a fused vitreous enamel coating, has applied to the reverse side an enamel mixture, which has incorporated therein a gas-producing agent and the article is fired. The enamel, on heating, begins to fuse and the gas evolves, slowly, causing the enamel to rise in a multitude of small bubbles, much after the same fashion in which ordinary dough rises after baking powder or yeast has been added, giving a final product of cellular structure, possessing greater thickness and greatly decreased specific gravity than ordinary porcelain enamels. The bubbles range from microscopic size upward, depending upon the material added to the enamel, and subsequent treatment of the latter. The small bubbles are not interconnected, and, therefore, provide a dead air space, which, combined with the low heat-conductivity of the porcelain enamel, form an excellent insulating medium for both heat and sound, which is permanently united with the metal base.

It is evident that a partial vacuum exists in some of the bubbles formed in the cellular backing by the process herein set forth, since the bubbles are formed by heated gases, which contract on cooling. This fact still further increases the efficiency of the insulating material. The presence of small gas bubbles in porcelain enamels and the introduction of materials as, for example, fluorides or organic materials capable of being absorbed by clay, to promote the formation of submicroscopic bubbles in said porcelain enamels for the purpose of increasing opacity, is well known in the art. These bubbles are not of sufficient size or total volume to produce the increased thickness and decreased specific gravity necessary for an insulating medium; and, therefore, bear no relation to the present invention.

It is desired to point out that the porcelain enamel which may be used to form the cellular backing is low in cost, and can be easily applied to the base member. No special enamel is necessary. In fact, it is possible to use what is ordinarily considered scrap enamel, that is thrown away in the enameling plant because of contamination with dirt or an admixture of enamels that would not combine ordinarily with one another. While this is the most economical source of the enamel material, the consumption of enamel for this purpose will, undoubtedly, exceed the amount of rejected enamel material on hand at any one time, and therefore, probably it will be necessary to mill up enamel for this specific purpose.

There is no special requirement relative to equipment, as the insulating producing material is applied in the same fashion as ordinary porcelain enamels.

In the ordinary process of porcelain enameling, the enamel may be applied in the form of an aqueous suspension or "slip" by dipping, spraying or slushing, and, as a dry powder, by dredging. Similarly, the insulating enamel may be applied as an aqueous suspension to sheets by dipping and spraying, to tile and formed parts by dipping, spraying and slushing or it may be applied to tile and similar shaped parts as a paste or a dry powder.

The preparation of the cellular material and its application to the base member does not introduce any steps into the enameling process that are unusual or different from ordinary practice.

Figure 1:
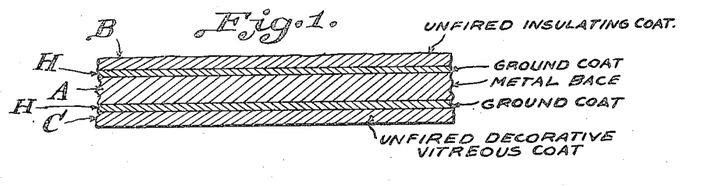
Figure 1 is a transverse section of the article before firing showing a base having on one of its surfaces a ground coat and thereon a coating of enamel adapted to form a cellular backing for the base, the reverse face of the base having a decorative vitreous coating thereon.
Figure 2:
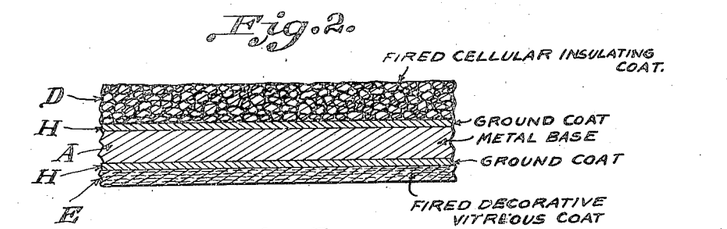
Figure 2 shows the above article after firing.

The following is an illustrative example of the present invention: Referring to Figure 1, a sheet or a shape properly fabricated to meet the architect's requirements is first cleaned by pickling or sandblasting, or other means, to remove scale and dirt, after which a coating or ordinary ground coat of porcelain enamel (H) such as is used every day in the enamel industry, is applied and fired on the sheet. The face is then decorated with the desired enamel (C), a plain color or a desired color scheme. Thereafter, there is applied to the back of the sheet, by spraying the insulating coating (B), prepared as hereinafter set forth.

The treatment of the insulating material will depend upon the final thickness desired. If a thin coating is desired, the enamel may be treated with a single fire as set forth below. If a thicker coating of the insulating material is desired, two or more coats may be superimposed, one upon the other. In this case, the first coat is dried and sintered by heating from one to two minutes, at a temperature below the decomposition temperature of the gas-evolving agent, as for example, at a temperature of approximately 1000° F. Thereupon, the next coating is applied and similarly treated. In the case of sprayed enamels, the application weight of each coat of enamel will be approximately 30 to 50 gms. per square foot, dry weight, in order to get the best results. In the case of dipped enamels or poured enamels, a slightly thicker coating may be applied. After a sufficient number of coatings of the insulating material has been applied, to give the proper thickness to the final product, the whole is burned. During the burning the liberation of gases by the gas-forming medium and the entrapping thereof by the enamel causes the latter to expand to a greatly increased thickness. In most cases, the firing temperature is about 1500° F. and the time of fire is approximately three minutes. However, the time and temperature of firing will be dependent upon the character of the enamel frit and gas-producing agent used in compounding the insulating material.

If a relatively thin coating of insulating material is desired, it is possible, instead of first firing the coating of ground coat enamel and then again firing after the insulating enamel has been applied, to apply and dry the ground coat and then spray the insulating enamel onto the dried ground coat and allow the water to evaporate. The article may then be fired as above described. In using this procedure, two separate firing steps are eliminated, the ground coat and insulating coat being fired at the same time. It is, of course, obvious that the order of firing steps may be changed and varied in accordance with the practice of those skilled in the art of applying porcelain enamel.

Figure 5:
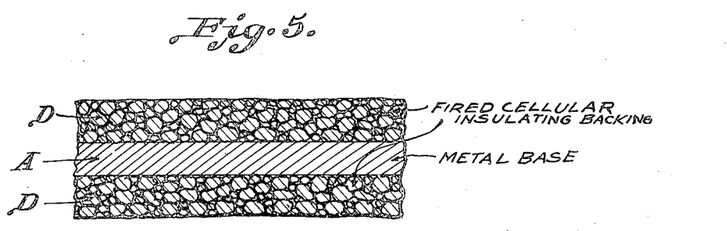
Figure 5 shows another form of the invention wherein the cellular insulating material is applied to both faces of the article base.

Other methods for the application of my product to the metal base will be at once apparent to those skilled in the art of porcelain enameling. For example, if it is desirable to coat both sides of the metal base with the insulating material, as illustrated in Figure 5, the insulating material in slip form will be set up to give the desired drain or application weight; the ground-coated metal base will then be dipped into the slip, removed and allowed to drain and dry. Subsequent treatment will be dependent upon the thickness of insulating medium desired; that is, if a relatively thin coating is desired, the article may be fired upon drying. If a thicker coating is desired, the insulating material will be sintered and subsequent coatings applied by dipping, the entire process, with exception of the application method, being similar to the example outlined above.

In using the present invention in connection with tile and similar articles of closed shape, it is possible to apply my material by slushing. In slushing, the material in slip form is poured into the metal article and the article so manipulated as to cover the entire inner surface with the material. The article is then dried and fired as above set forth. A much heavier coating may be applied by this process than by other "wet" methods so that it will usually be possible to secure an adequate insulative thickness with a single application.

My invention may be applied to flat closed shapes as tile, shingles and the like, in paste or powdered form. The use of my material as a powder is especially desirable, since adequate thickness may be secured with a single application, the drying step is eliminated, no sinter is required, and the firing temperature may be reduced to 1200° F. Further, the powders are dry ground, requiring no mill addition other than the enamel frit and the gas-producing medium.

In preparing my insulating material, the choice of enamel frits will be to a large extent governed by the gas-producing media used, since the evolution of gases will be resultant either from the disintegration of said medium due to thermal action or to the reaction of the medium with the enamel during fusion. The latter is the preferred type, since it is more readily controlled. The above reactions are of a thermo-chemical nature so that choice of proper enamel frits for the present invention will be dependent not only upon the chemical composition of the frit but upon the fusion temperature thereof. For example, Formula No. 1, given below, is representative of a type of frit which becomes fused or viscous, at a temperature of approximately 1500° F., while Formula No. 2 is representative of a type of frit which fuses or becomes viscous at a temperature of approximately 1200° F. When cobaltous-cobaltic oxide ($Co_3O_4$) is fused into an enamel, it is taken into solution as cobaltous oxide ($CoO$) with the liberation of one molecule of oxygen, the latter in the form of a gas which is entrapped in the viscous enamel, causing it to swell. When enamel frit of Formula No. 1 is used at a temperature of 1500° F., the reaction takes place and swelling results. If, on the other hand, the enamel frit of Formula No. 2 is used mixed with cobaltous-cobaltic oxide, and heated to the fusion point of the enamel at 1200° F., the temperature is not sufficient to induce the reaction and no swelling results. Further, if calcium carbonate ($CaCO_3$) or dolomite ($Ca$—$MgCO_3$) be used with an enamel frit of the composition shown in Formula No. 1, no chemical reaction will take place, even though the mixture be heated to 1500° F. On the other hand, when enamel frit of the composition shown in Formula No. 2 is used with these gas-producing agents, an excellent insulating material may be obtained by heating to 1200° F. Other gas forming materials, as for example, barium carbonate ($BaCo_3$) will give equally good results with either type of enamel frit.

*Formula No. 1*

Typical enamel frit fusing at approximately 1500° F.

| | Parts by weight |
|---|---|
| Borax | 26.0 |
| Sodium nitrate | 6.2 |
| Fluorspar | 5.8 |
| Cryolite | 12.5 |
| Flint | 15.3 |
| Feldspar | 27.1 |
| Zinc oxide | 1.4 |
| Potassium carbonate | 1.0 |
| Sodium antimonate | 4.1 |

*Formula No. 2*

Typical enamel frit fusing at approximately 1200° F.

| | Parts by weight |
|---|---|
| Feldspar | 29.5 |
| Sodium nitrate | 4.1 |
| Sodium carbonate | 1.6 |
| Borax | 25.4 |
| Litharge | 24.6 |
| Zinc oxide | 5.7 |
| Cryolite | 1.2 |
| Fluorspar | 5.7 |
| Antimony oxide | 2.2 |

It will be readily understood that the above compositions are merely typical examples of enamel frit compositions, and the present invention is in no way limited to their use, but may include any enamel frit which will react with a gas-forming medium to form the insulating material of the present invention.

The insulating enamel may be compounded as follows:

*Formula No. 3*

| | Pounds |
|---|---|
| Vitreous enamel frit (see Formula No. 1 for preparation of frit) | 100 |
| Cobalt oxide (Cobaltic-cobaltous oxide —$Co_3O_4$) | 5 |
| Nickelous oxide | 10 |
| Water | 35 |

The above mixture prior to application to the metal sheet is charged into a pebble mill and ground to a fineness of one gram residue on a 325 mesh screen from a 500 gram sample, wet weight. In the case of the application of the enamel by slushing as cited above, it may sometime be necessary to grind to a lesser fineness in order to prevent cracking in drying. This fineness may be readily controlled by those skilled in the art. If the material tends to settle, a small amount of magnesium sulphate or equivalent material is added to keep the material in suspension in the aqueous dispersion medium.

The fineness of grinding has a notable effect upon the final material, as the coarser ground material gives less insulating effect than the finer ground material.

During the firing, the cobalt oxide reacts with the enamel frit as set forth above, releasing some of its oxygen. The cobalt oxide being well distributed in the porcelain enamel mixture, the oxygen evolved therefrom on heating is more or less evenly dispersed through the enamel mass, in the form of bubbles. The bubble size affects the final product in that fine bubble structure will give better insulating value than a coarse or large bubble structure. As the breaking down of the cobalt oxide occurs at a temperature at which the vitreous mass has begun to fuse, the evolved gas cannot escape and the enamel is, therefore, caused to swell and form a cellular structure of greatly increased thickness and decreased specific gravity. Upon cooling, the mass retains its swollen form and provides an insulating material of high resistance to heat transmission.

Other vitreous enamel mixtures may be used with equal success, with slight changes in the firing cycle. Such changes will be obvious to anyone skilled in the art of porcelain enameling.

It will be readily understood by those skilled in the art that the above Formula No. 3 and the subsequent formulae given below, relate to the preparation of the insulating material in aqueous suspension or so-called "slip" form. Formulae for the preparation of the material as a dry powder are essentially similar with the exception that water and the flotation agents as clays, bentonite and the like are omitted from the mill.

The following examples set forth wet milled mixtures, which have given satisfactory results:

Formula No. 4

|  | Preferred | Limits |
|---|---|---|
|  | Pounds | Pounds |
| Vitreous enamel frit (No. 2) | 100 |  |
| Powdered dolomite (a natural calcium-magnesium carbonate) | 7½ | 5 to 15 |
| Vallendar clay | 8 |  |
| Water | 40 |  |

Formula No. 5

|  | Pounds | Pounds |
|---|---|---|
| Vitreous enamel frit (No. 2) | 100 |  |
| Calcium carbonate (CaCO₃) | 5 | 2½ to 10 |
| Water | 30 |  |

Formula No. 6

|  | Pounds | Pounds |
|---|---|---|
| Vitreous enamel frit No. 1 | 100 |  |
| Barium carbonate | 10 | 7½ to 15 |
| Bentonite | ¼ |  |
| Water | 35 |  |

Formula No. 7

|  | Pounds | Pounds |
|---|---|---|
| Vitreous enamel frit No. 2 | 100 |  |
| Barium carbonate | 5 | 2½ to 10 |
| Bentonite | ¼ |  |
| Water | 35 |  |

Formula No. 8

|  | Pounds | Pounds |
|---|---|---|
| Vitreous enamel frit No. 1 | 100 |  |
| Cobaltous-cobaltic oxide | 5 | 2½ to 7½ |
| Water | 35 |  |

Admixtures of the above formulae have also been found in some cases to lead to advantageous results, as with the following:

Formula No. 9

|  | Preferred | Limit |
|---|---|---|
|  | Pounds | Pounds |
| Vitreous enamel frit No. 1 | 100 |  |
| Cobaltous-cobaltic oxide | 2½ | 2½ to 5 |
| Barium Carbonate | 7½ | 5 to 10 |
| Bentonite | ¼ |  |
| Water | 35 |  |

Typical examples of dry milled mixtures are as follows:

Formula No. 10

|  | Preferred | Limit |
|---|---|---|
|  | Pounds | Pounds |
| Vitreous enamel frit No. 2 | 100 |  |
| Calcium carbonate | 1 | ½ to 2½ |

Formula No. 11

|  | Pounds | Pounds |
|---|---|---|
| Vitreous enamel frit No. 1 | 100 |  |
| Barium carbonate | 10 | 5 to 15 |

Formula No. 12

|  | Pounds | Pounds |
|---|---|---|
| Vitreous enamel frit No. 2 | 100 |  |
| Barium carbonate | 7½ | 2½ to 10 |

The above examples are merely illustrative of suitable mixes for preparing the insulating backing, and many variations thereof will occur to those skilled in the art. In general, it may be stated that about one per cent (1%) to fifteen per cent (15%) of the gas-evolving agent may be incorporated in the vitreous enamel mix and produce satisfactory commercial results. However, the amount of the gas-evolving agent added to the vitreous enamel material will depend on a number of factors including the character of each of these two ingredients, the time of smelting, and the temperature of smelting. Therefore, applicant does not wish to be limited in all cases to this range of the gas-evolving agent, but wishes to cover any composite structural article having a vitreous enamel backing which has become highly expanded or extended, due to the incorporation of a large volume of gases and the vitreous enamel material, said gases also functioning to greatly reduce the specific gravity of the backing.

The combination of materials and frits may be changed, the sequence of steps set forth need not be followed and the temperature at which the enamel is fired may be changed since with some gas producing agents, the bubbling or evolution of gas begins at quite a low temperature. The gas producing agent may be any of a number of insoluble organic or inorganic products, such as the various oxides, carbonates, sulphides and other compounds which, at higher temperatures, release the water of crystallization or dissociate at a controllable rate.

The following is a table showing the effect of various types and amounts of gas-producing medium upon the thickness and specific gravity of the insulating material, the same weight of material being applied in each instance. It follows, naturally, that the greater the thickness and the lower the specific gravity of the insulating material produced, the greater will be the insulating properties of the material.

Table No. 1

*Specific gravity and thickness of several insulating enamel compositions*

| Formula | Percent gas forming material | Specific gravity | Thickness | Volume (without steel) | Percent increased volume | Percent decreased Sp. Gr. |
|---|---|---|---|---|---|---|
| | | Gms./cc. | Mm. | Cc. | Percent | Percent |
| Base enamel | None | 2.140 | 4.50 | 25.00 | | |
| No. 3 | 5% Co₃O₄—10% Ni₂O₃ | 0.566 | 6.61 | 84.7 | 339 | 378 |
| No. 6 | 10% BaCO₃ | 0.637 | 5.60 | 82.4 | 330 | 336 |
| No. 9 | 5% Co₃O₄—10% BaCO₃ | 0.512 | 6.50 | 100.15 | 460 | 418 |
| No. 8 | 2½% Co₃O₄ | 0.742 | 5.07 | 71.6 | 286 | 288 |
| No. 12—Dry | 10% BaCO₃ | 0.340 | 15.60 | 129.6 | 668 | 630 |
| No. 10—Dry | 1% CaCO₃ | 0.336 | 14.81 | 165.0 | 660 | 636 |

The above examples are illustrated of insulating backings which have become highly extended, or, stated differently, have a greatly increased volume, and a specific gravity which is materially less than the specific gravity of the unfused vitreous enamel material. In general, satisfactory commercial results can be obtained by trapping a sufficient volume of gases to cause the final insulating backing to have a specific gravity less than one-half of the specific gravity of the original vitreous enamel material. In general, the specific gravity may vary between one-eighth and one-half of the specific gravity of the original vitreous enamel material, and the volume of the final backing may be about two to eight times the original volume of the applied vitreous enamel material. In some cases, the specific gravity may vary between one-third and one-sixth of the specific gravity of the original vitreous enamel material, and the volume of the final backing may be from three to six times of the original vitreous enamel backing. However, applicant does not wish to be limited in all cases to the production of an article having an insulating backing of the final specific gravity above referred to, or having a volume increase of the character specified. It is sufficient if the vitreous enamel material, by virtue of the presence of a large volume of gases, has had its non-insulating character changed so that it becomes insulating. It is desired to point out that the volume of the backing may be considerably greater than approximately eight times the volume of the original enamel layer and that the amount in which the enamel is extended will depend upon the purpose for which it is used. The greater the extension the greater the insulating properties of the material.

While in the preferred method of carrying out the invention it is desired to first treat the metal sheet with an ordinary ground coat enamel, it is possible, when the insulating material contains the oxides of cobalt and nickel, to dispense with the ground coat and apply the insulating enamel mix directly to the metal sheet. Further, the decorative vitreous coating and insulating coating may be applied separately, or at the same time. Additionally, the insulating coating may be applied in a number of layers, one over the other.

The basic principle herein disclosed may be greatly varied to produce an article having an insulated surface or backing that is permanently united to the article base, and an inherent part of the base member, which carries in the preferred form of the invention a vitreous coating. The basic process by which the insulating backing is produced comprises forming a vitreous or semi-vitreous mix to which there has been added a gas producing agent which on heating will cause the gas to evolve or effervesce, the mixture producing a similar mass of sufficiently increased thickness and decreased specific gravity to cause it to be resistant to the transfer of heat and sound.

The material and process requirements and limitations may be summarized as follows:

Material requirements:
1. A material which will form on firing a vitreous or semi-vitreous mass that will be plastic in the required temperature range.
2. A gas producing agent.

Process requirements:
1. A uniform mixture of the material with the gas producing agent.
2. Firing treatment sufficient to cause the evolution of the gas, and fusion or partial fusion, or softening, of the mass producing the vitreous or semi-vitreous cellular backing.

Material limitations:
To substances which dissociate with the evolution of gases in a controllable manner, at temperatures not exceeding normal enamel ranges, or which react with the mixture with the evolution of gases, said materials being of such form that they may be intimately mixed with the enamel and applied through an orifice, as with a spray gun and which further do not greatly affect the physical properties of the burned enamel as maturing temperature, expansion and contraction, and strength.

Process limitations:
1. Firing time and temperature, separately or both together, to be limited sufficiently low to just allow the mass being melted to approach the plastic phase, but not the liquid phase of the mixture.

The firing time and temperature vary for the mixture used. For example, with a frit of relatively low fusion point and high fluidity as of the type set forth in Formula No. 2 above, the most satisfactory firing cycle is 1200° F. for three to four minutes, and for a mixture with a more refractory frit of great viscosity, as of the type set forth in Formula No. 1, the cycle is 1450–1500° F. for three minutes. The time of burning can be increased without difficulty, by lowering the temperature. The softness of the mixture is of great importance, but the viscosity also has a considerable effect upon the results. The limit in the firing cycle is the point where the mass becomes so fluid that these gases causing the cellular structure are released, and the mixture fuses to a relatively solid mass. It naturally follows that with two materials of the same melting point, the more viscous of the two will resist the release of the gas longer than the more fluid one. From this point of view, it follows that a relatively viscous enamel or mixture of enamels is desirable, particularly as the material reaches its greatest strength when it is fired just to the point where it becomes sufficiently molten to form a vitreous or semi-vitreous mass.

It is natural to expect that the application weight, the burning time and temperature, either individually or collectively, as well as the gas-forming material itself will have considerable effect upon the quality of the resultant product. Increased application weight increases the resistance to heat and sound transmission in direct ratio to the increased thickness of the insulating coating resultant from said increased application weight.

The following is a table showing the effect upon the relative insulating value of thin coatings of the material as produced, using Formula No. 3 under conditions hereinbefore specified.

material compares favorably with that of other insulating materials, such as asbestos board, sil-o-cell, sheet rock and the like.

While smelted frits have preferably been used in the preparation of the insulating material, it is also possible to use raw frits or glazes. An enamel may be compounded as shown in Formula No. 1 or No. 2.

Ordinarily, these materials would be mixed well and smelted in a reverberatory smelter until all gases had been released and the materials had dissolved one into the other. The molten mass would then be poured into cold water and water-cracked, the product being then known as frit.

TABLE No. 2

Part I—Variation of weight of coating

| Burning cycle | | | Temperature differential in percent | | | |
|---|---|---|---|---|---|---|
| 1 | 2 | 3 | | 4 | 5 | 6 |
| Burning time | Burning temperatures | Application wt. of coating in gms./sq. ft. | Heating time......<br>Temperature of heated side...... | 10 minutes<br>520° F. | 20 minutes<br>960° F. | 30 minutes<br>1255° F. |
| Min.<br>2½<br>2½<br>2½ | ° F.<br>1350<br>1350<br>1350 | Gms./sq. ft.<br>38<br>77<br>115 | | Percent<br>58<br>47<br>47 | Percent<br>74<br>67<br>66 | Percent<br>81<br>76<br>74 |

Part II—Variation in burning cycle

| | | | | | | |
|---|---|---|---|---|---|---|
| Min.<br>2½<br>3<br>3½<br>2<br>2<br>2<br>2<br>2 | ° F.<br>1350<br>1350<br>1350<br>1250<br>1300<br>1350<br>1400<br>1450 | Gms./sq. ft.<br>38<br>38<br>38<br>77<br>77<br>77<br>77<br>77 | Insufficient Firing—Shivering<br><br>Overfired—Chipping | Percent<br>58.9<br>48.5<br>46.7<br>58.3<br>55.9<br>52.8 | Percent<br>74.0<br>71.0<br>70.0<br>78.0<br>75.5<br>69.8 | Percent<br>81.0<br>81.0<br>79.0<br>84.2<br>83.4<br>76.0 |

Part I of the table shows the effects upon the insulating properties of the material caused by variation in thickness of coating (said coating thickness being directly proportional to the application weight of the insulating enamel in grams per square foot, as set forth under Column 3 of the table.)

Part II shows the effect of variations in the burning cycle, the time of burning being set down in the Column No. 1 and the temperatures of burning being set down in Column No. 2.

The heat insulating value of a material may be said to be the measure of the ability of that material to resist the flow of heat so that the differential in temperature between one side of a material which is directly in contact with the source of heat and an opposite side of the material which is not in contact with said source of heat over a period of time gives a measurement of the relative insulating value of the material. Columns 4, 5 and 6, of Table II give the relative insulating values of the material as the percent differential temperature between the heated and non-heated sides of the material as compared with the heated side at the end of periods of 10, 20 and 30 minutes, the respective temperatures on the heated side of the material being 520, 960 and 1255° F. respectively.

The data presented in Table 2 shows the insulating value of my material to increase with increased thickness of coating (increased application weight), increased burning time and increased burning temperature. Changes in the burning cycle are limited by the physical properties of the resultant product.

The insulating value of typical examples of my

This frit is then ground in a pebble mill, with the necessary water and clay to keep the frit in suspension, and applied by spraying or dipping on a prepared metal base.

During the smelting of enamels a great volume of gas is released, the average raw batch losing about 20% of its weight in smelting. This loss is mostly water of crystallization, carbon dioxide, some fluorine and nitrous oxide, and a small amount of some of the more stable components, which combine with the more volatile constituents and are carried off. If the raw materials instead of being smelted are well mixed or ground in water and then sprayed or dipped onto a prepared base, upon firing, the smelting action begins and the gases are released. A spongy mass in the final analysis, the same as obtained in the frit method of producing the insulating material, results, although this method of procedure is not quite as satisfactory as the frit method, as it is not as easily controlled. In the case of the use of the raw frit or glaze, the addition of an extra gas forming or producing agent is not usually required.

It is possible to produce a porcelain enamel frit, which will bubble badly in firing, without the aid of an extra gas evolving material. This may be accomplished in two ways—first, by insufficient smelting of the enamel, in which smelting continues upon application to the reverse side of the enameled article, during burning. The other is to load the enamel up with materials unstable at smelting temperature to the point where, under normal smelting practices, they are not entirely decomposed and continue to break down and escape from the enamel during the subsequent firing onto the metal base.

While a fineness of one gram on a 325 mesh screen, from a 500 gram sample, wet weight, is described, the material works equally as well when ground coarser, except that a slight increase in firing time or temperature is required. For example, when the material is ground to a fineness of 8 grams on a 150 mesh screen, from a 100 gram sample, wet weight, the firing cycle is 1450° F. for 2½ minutes, to produce the same surface obtained at 1350° F. for 2½ minutes, with a finer ground material. For practical purposes and economies, it is equally as satisfactory to grind the material to the coarser degree.

It has been further found that it is possible to use a lesser amount of a gas-forming agent, to produce the same effect, if this agent is only mixed into the enamel and not ground in. The finer grinding causes an earlier breakdown of the gas-forming materials, and some of the gases are permitted to escape before the enamel becomes sufficiently soft to seal them in. Coarser particles, naturally, do not break down so early, and a larger proportion of gas released is retained.

The color of the insulating material seems to have considerable effect upon the resistance to heat transfer. Inasmuch as the dark colors absorb radiant heat in larger proportions than light colors, it is preferred to use the latter. As it is possible to make this insulating enamel in any color desired, the additional insulating qualities obtainable in this manner are readily realized.

From the point of view of service, the most outstanding advantage of using a porcelain enamel or a vitreous or ceramic material for the insulating backing is its almost negligible absorption. Most insulating materials absorb more than their own weight of water. Water poured upon many insulating materials is immediately taken in, while water poured upon the material herein disclosed shows no more signs of absorption than any ordinary porcelain enamel surface, except that which might be taken up by certain small holes in the surface of capillary size.

Moisture is, undoubtedly, the cause of the ultimate failure of any bonds with which an insulating material is made to adhere to a metal or porcelain enameled surface, but as it is impossible for moisture to penetrate this material, and further as there is no bond, other than that from the partial fusion, used to bring about adhesion, this material is most ideal for building purposes and refrigerator work, where frequent failure of other insulating materials, due to moisture, is met. When properly fired, each small air cell in this material is individual and not connected.

A 3" x 4" enameled tile, backed up with this enamel insulating material, and applied 96 grams per square foot, dry weight, fired at 1350° F. for 2½ minutes, was placed in boiling water for one hour, and allowed to cool in the water. The excess water was wiped off and the tile weighed immediately. It was found that it had absorbed .18 grams of water. It was then allowed to lie in the open room for ten minutes, and weighed again, when it showed a retention of .11 grams of water; in 30 minutes, .07 grams of water were retained.

Considering the area over which this absorption occurred, it is evident that this material has practically no porosity, and that the slight absorption herein set forth was not much more than a surface condition.

Figure 3:
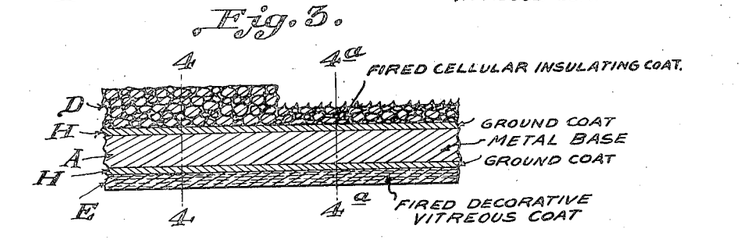
Figure 3 is a transverse section showing the fired article provided with the cellular insulating coating from which the top surface or layer has been removed to provide a surface of greatly increased adhesive or gripping power.
Figure 4:
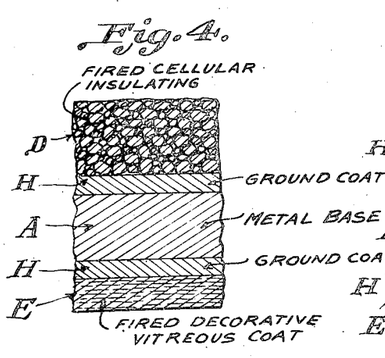
Figure 4 is an enlarged cross section taken on the line 4—4 of Figure 3.
Figure 4A:
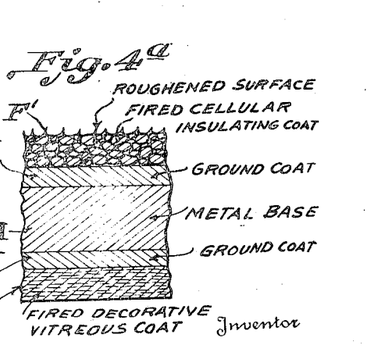
Figure 4a is an enlarged cross section taken on the line 4a—4a of Figure 3.

While the properly fired surface is relatively smooth, it has a mat appearance. The glass-like surface is missing. This mat surface is a great aid toward obtaining an increase in the adhesion of an enameled article to a concrete or plaster or similar surface. A great increase in the adhesion, however, can be obtained as follows:

If, as shown in Figures 3, 4 and 4a, the top surface or layer of the insulating enamel (D) after firing is removed by any appropriate means, thereby exposing the immediately adjacent layer (F) of the multi-cellular structure, the gripping area thereof is increased considerably and the adhesive power of the surface (F) is double that obtained with a smooth enameled surface. The force, when applied at one end, required to pry off a 3" x 4" ordinary smooth enamel tile from a concrete wall was 10 lbs., as compared with 22 lbs. to remove a similar tile, backed by multi-cellular insulating material herein disclosed from which the tip surface or layer has been removed. The cellular structure provides a multiplicity of small cup-like depressions which become filled with the cement or plaster. The degree of adhesion is somewhat influenced by the size of these cup-like depressions, the smaller the size, within limits, the greater the adhesion, for the reason that the smaller the depression size, the greater the relative area contacting the cement or plaster.

The adhesive properties of the cellular backing from which the surface layer has been removed to expose the multi-cellular structure may be controlled by varying the kinds of materials used to produce the cellular backing, the physical condition thereof, and the conditions under which the cellular backing is produced. More specifically, the size of the cells and their number may be controlled by varying the kind of gas-producing agent used; the amount thereof; the fineness thereof; the fineness of the enamel; the temperature of firing; the time of firing; and the uniformity of the mixture of enamel or equivalent materials and its addition agents such as clay and the like, and gas-producing material. These variables may be combined in any combination as will be apparent to those skilled in the art after once being given the broad inventive disclosure of controlling the size and number of the cells.

It is also possible to so compound the enamel frit that when it has been incorporated with the gas evolving agent, the stresses upon cooling will be so great as to cause the upper layer to sliver off and eliminate the operation of removing the first layer or plane of the multi-cellular structure. This can be accomplished by using porcelain enamels or equivalent materials, as herein set forth, having a high coefficient of expansion, or widely different expansions. Several types of porcelain enamel of this character are well known in the industry. The basic idea of this form of the present invention is to compound the enamel or equivalent material so that on cooling the stresses set up in the cellular enamel will be sufficient to sliver off the top layer and leave a surface of great adhesive properties having small cup-like depressions or cells, and this may be accomplished by various means. In this form of the invention the size and number may be controlled by varying the kinds of materials used, the physical condition thereof, and the conditions under which the cellular backing is produced, as immediately set forth above.

Figure 6:
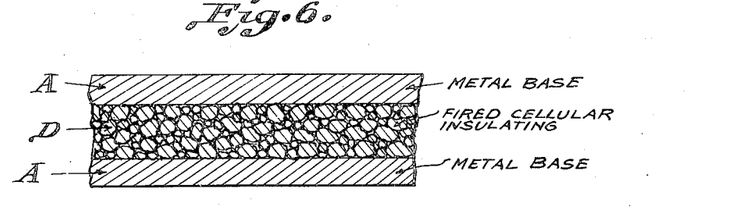
Figure 6 shows another variation of the basic invention wherein the cellular insulating backing is sandwiched in between two metal sheets or equivalent material.

While one of the most predominant uses for the present invention is the provision of an insulating backing for porcelain enamel shapes, an excellent insulating filler may be obtained as shown in Figure 5, by applying the insulating material (D), including a porcelain enamel mix, to both sides of a base (A) of the character herein set forth and particularly to a metal sheet. The process is the same as that used for applying the insulating material to the decorated enamel form, except that the insulating material containing a gas-producing agent is sprayed on both sides of the article instead of only one side, as when forming an article one side of which has a decorative vitreous or porcelain enamel coating. Of course, after the article has been sprayed on both sides with the insulating material, the article is fired, as hereinbefore set forth. The insulating material may be in some cases applied to articles of this nature by the process of dipping as has been hereinbefore set forth. This process is capable of use with greater economy than the spraying process. Further, an especially strong insulating article may be made by sandwiching the insulating enamel mixture between several sheets of very light gauge metal and firing. In this manner the sheets (A) are held securely together by the cellular insulating enamel (D) as shown in Figure 6, and at the same time an article of indefinite thickness may be built up. To lighten the article, as shown in Figure 7, a perforated sheet or wire mesh may be substituted for the thin sheet.

A further variation of the basic invention herein disclosed is to eliminate the metal or base sheet entirely and run the fused or semi-fused cellular insulating material such as porcelain enamel, into a container and allow it to form into a solid block. By this method a vitreous enamel cellular insulating material may be obtained, that is equivalent to other highly rated insulators and has the same workability. Additional strength may be obtained by embedding in the mass a fine wire mesh.

Figure 7:
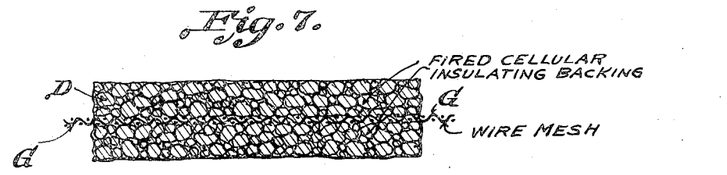
Figure 7 shows a still further variation of the invention whereby a perforated sheet or wire mesh is sandwiched in between two fired insulating backings having a cellular structure.
Figure 8:
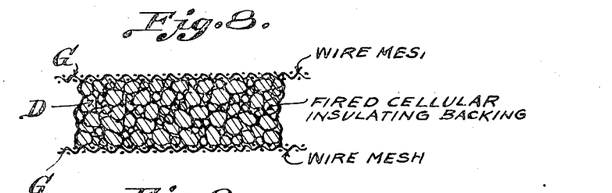
Figure 8 shows a modification of the article set forth in Figure 7, the fused cellular insulating material being sandwiched in between two perforated sheets or wire meshes.
Figure 9:
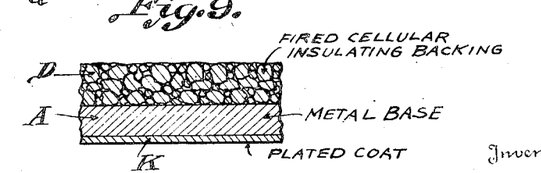
Figure 9 is a further modification showing a base plated on one face and carrying a cellular insulating coating on the other face.

It is further possible to apply the insulating material to a fine wire mesh or perforated plate (as illustrated in Figure 7), by spraying or dipping providing that the perforations or mesh are not of excessive size. In this manner, an insulating filler of very light weight may be built up. It is possible to further strengthen this light weight insulating filler by sandwiching the insulating material between two perforated plates or wire meshes, as shown in Figure 8. This may be accomplished by placing a heavy paper backing behind one plate or mesh. Applying the insulating enamel to the proper thickness and finally placing the mesh or plate over the top of the article. By this means an excellent and inexpensive insulating filler for use in stores, refrigerators and the like may be made.

While the present invention is directed in its most specific aspect to an insulating article comprising a metal base having permanently united thereto a cellular backing derived from the smelting of porcelain enamel or other materials adapted to produce a vitreous, semi-vitreous or ceramic mass, said mass before firing carrying a gas-producing agent which on firing evolves a gas, it is clear that any suitable base may be substituted for the metal base and other materials may be substituted for the porcelain enamel. For example, while the usual base material is sheet or cast iron, other metals such as copper, nickel, chromium plated steels and metals may be utilized as the base member. Such a metal base may or may not carry a vitreous coating on the face opposite to that carrying the cellular insulating coating. For example, the metal face may be chromium plated and the opposite base carry the cellular insulating backing. However, for the exterior of building walls it is preferred that the exterior face carry a vitreous coating, which may have a decorative effect, such effects being well known in the porcelain enamel art. The articles herein disclosed may also be used for the interior walls of buildings, and may be applied directly to the usual brown coat of plaster finish. The exposed face of the metal base may have a vitreous enamel coating, or may be chromium plated or otherwise, provided with a suitable finish.

While porcelain enamel-producing material adapted to form a porcelain frit, a glass forming enamel, a vitreous forming enamel, and glass may be used in carrying out the present invention, and further, while broadly these materials are equivalents, more specifically each type of material adapted to form the cellular backing has its particular advantages.

The invention disclosed herein not alone provides an article with resistance to heat transfer, but also it acts to deaden sound. One objection to the porcelain enameled sheet metal article is its tinny sound. Most heat insulators are also sound insulators. The hereinbefore described insulating substance is similar to them in this respect. Articles or shapes to which it has been applied have a very solid sound and are totally free from this objection.

Stamped porcelain enamel sinks, for example, sound very weak struck, if no sound deaden provision has been made, but if the enamel applied to the back is treated as herein described, the sound is much the same as is gotten from a cast iron sink.

There is nothing different in the compounding of the material or the application for sound insulation from that already given on heat insulation. This use is given to show another use for the invention as disclosed.

The present invention may be used to apply a cellular backing on tile, shingles, spandrels, strips, and panels, and, in general, for the usual building elements. Also, it may be used wherever insulation is required, and the heating process is permissible.

It will be readily understood by those skilled in the art of porcelain enameling that the increased volume and decreased specific gravity of the insulating material as compared with the unfused vitreous enamel material will be dependent upon the basic porcelain enamel used, upon the type and amount of gas-forming medium and upon the method of application. Thus, for example, when the application is made by spraying, the increase in volume will be between four and five times while the specific gravity will be less than one-fourth of the original. When the material is applied as a dry powder, the volume may increase between six and seven times and the specified gravity be decreased by the same amount. On the other hand, should the material be applied as shown in Figures 6 and 8 so that the insulating material is supported both above and below, either by thin metal plates or wire mesh, a more fragile material may be used and it will be possible to further increase the extension of volume and further decrease the specific gravity. In this way it becomes possible to increase the volume by eight times and similarly decrease the specific gravity to one-eighth of the specific gravity of the unburned material. Since even greater increase in volume is possible by the proper combination of vitreous enamel material and gas-forming material, it will be obvious to one skilled in the art to decrease the specific gravity and increase the volume to any desired amount. Therefore, it is not desired to limit the invention to the specific limit of extension set forth or the specific decrease in the specific gravity set forth, but to claim any extension of volume and decrease in the specific gravity which may be obtained by following the present invention.

It is desired to point out that the preferred gas-forming mediums are cobalt oxide, or a mixture of cobalt and nickelous oxide, or barium carbonate, or a mixture of cobalt oxide and barium carbonate, or a mixture of cobalt oxide, nickelous oxide as set forth, and barium carbonate.

When the cobalt oxide is used alone as a gas-evolving agent in a mixture with porcelain enamel material, the preferred percentages are between 2½% to 7%, and when the barium carbonate is used alone, the preferred percentages are between 10% and 15%.

When a mixture of nickelous oxide and cobalt oxide, as set forth, is used as the gas-evolving agent, the preferred percentages are 5% of nickelous oxide and between 2½% and 7% of cobalt oxide.

If cobalt oxide is used in a mixture with barium carbonate as the gas-evolving agent, the preferred percentages are from 2½% to 5½% of cobalt oxide, and from 5% to 10% of barium carbonate.

If a mixture of nickelous oxide, barium carbonate and cobalt oxide is used as gas-evolving agents, the percentages are 5% of nickelous oxide, 2½% to 5% of cobalt oxide, and 5 to 10% of barium carbonate. All of the percentages are taken on the weight of the vitreous enamel frit used in the mix.

Calcium carbonate is an example of an alkaline earth carbonate. While it is preferred to use carbonates of this class, it is desired to point out that other metal carbonates may be used. Instead of using the carbonates as the gas-evolving agent, in some cases, the alkaline earth sulphates may be used, such as barium, calcium, strontium sulphate. Other metal sulphates may also be used.

While it is preferred to use from one-half per cent (½%) to fifteen per cent (15%) of the gas-evolving agent, in some cases, the limit may be from one-half per cent (½%) to twenty per cent (20%).

The cellular porcelain enamel made by incorporating a gas-evolving agent in a vitreous enamel material, fusing the resulting mix to a viscous condition and trapping the evolved gases in a volume adapted to cause the cooled material to be highly extended and to have a specific gravity varying within the limits hereinbefore set forth, may be cast into blocks or the like, as by pouring, in a liquid state, into molds. At least one surface of these blocks of highly extended cellular porcelain enamel may be provided with cup-like depressions by any of the methods herein-disclosed to greatly increase the gripping area of the surface.

The present application is a continuation-in-part of application Serial No. 666,714, filed April 18, 1933.

The phrase "a metal base having permanently united therewith a fused cellular insulating backing" or equivalent phrases, covers the direct uniting of the fused cellular backing to the metal base or the uniting of the cellular backing to the metal base through the intermediary of a ground coat.

What is claimed is:—

1. A composite insulating article comprising a metal base having permanently united therewith a fused cellular insulating backing comprising the fusion product of a layer of vitreous enamel material in the presence of a gas-evolving agent, the thickness of the extended fusion layer being at least twice that of the original unfired layer of material, and the specific gravity of the insulating backing being at least one-half or less that of the specific gravity of the original vitreous enamel material.

2. A composite insulating article comprising a metal base having permanently united therewith a fused cellular insulating backing comprising the fusion product of a layer of vitreous enamel material in the presence of a gas-evolving agent, the volume of the fused backing being from two to eight times its original volume, and the specific gravity of the insulating backing being between one-eighth and one-half of the specific gravity of the original vitreous enamel material.

3. A composite insulating article comprising a metal base having permanently united therewith a fused cellular insulating backing comprising the fusion product of a vitreous enamel material and a cobalt oxide, the mixture thereof being adapted to evolve gases, said insulating backing being highly extended due to a large volume of trapped gases, and having a specific gravity varying between one-eighth (⅛) and one-half (½) of the specific gravity of the unfused vitreous enamel material.

4. A composite insulating article comprising a metal base having permanently united therewith a highly extended fused cellular insulating backing comprising the fusion product of a vitreous enamel frit and one per cent (1%) to fifteen per cent (15%) of a gas-evolving agent, the percentage of the latter being taken on the weight of the vitreous enamel frit, said backing having a specific gravity varying between one-eighth (⅛) and one-half (½) of the specific gravity of the original vitreous enamel material.

5. A composite insulating article comprising a metal base having permanently united therewith a fused cellular insulating backing, the exposed surface of which is provided with cup-like depressions to increase the gripping area of said surface, said insulating backing being highly extended due to a large volume of trapped gases, and having a specific gravity varying between one-eighth (⅛) and one-half of the specific gravity of the unfused vitreous enamel material.

6. A composite insulating article comprising a metal base having permanently united therewith a fused cellular insulating backing, the fused surface of which is provided with cup-like depressions to increase the gripping area of said surface, said insulating backing comprising the fusion product of a vitreous enamel material and from one per cent (1%) to fifteen percent (15%) of a gas-evolving agent, the percentage of the latter being based on the weight of the vitreous enamel material, said backing having a specific gravity varying between one-eighth (⅛) and one-half (½) of the specific gravity of the original vitreous enamel material.

7. A composite insulating article comprising a metal base having an insulating backing permanently attached to each side of the base, each of said insulated backings comprising a fusion product of a vitreous enamel material in the presence of a gas-evolving agent, and having a specific gravity varying between one-eighth (⅛) and one-half (½) of the specific gravity of the unfused vitreous enamel material.

8. A composite insulating article comprising wire mesh plates having interposed therebetween and permanently united thereto the fused cellular insulating material comprising the fusion product of a vitreous enamel material in the presence of a gas-evolving agent, said insulating material being highly extended due to a large volume of trapped gases and having a specific gravity varying between one-eighth (⅛) and one-half (½) of the specific gravity of the original vitreous enamel material.

9. A composite insulating article comprising a metal base having permanently united therewith a fused cellular insulating backing comprising the fusion product of a layer of vitreous material in an intimate mixture with one-half per cent (½%) to fifteen per cent (15%) of a gas-evolving agent based on the weight of the vitreous material, the volume of the fused backing varying between two to eight times its original unfused volume, and the specific gravity of the insulating backing varying between one-half and one-eighth of the specific gravity of the unfused vitreous material.

10. A composite insulating article comprising a metal base having permanently united therewith a fused cellular insulating backing comprising the fusion product of a layer of vitreous material in an intimate mixture with one-half per cent (½%) to fifteen per cent (15%) of a gas-evolving agent, based on the weight of the vitreous material, the gas-evolving agent being selected from the group consisting of an oxide, a carbonate, a sulphate, or combinations thereof, the volume of the fused backing varying between two to eight times its original unfused volume, and the specific gravity of the insulating backing varying between one-half and one-eighth of the specific gravity of the unfused vitreous material.

11. A composite insulating article comprising a metal base having permanently united therewith a fused cellular insulating backing comprising the fusion product of a layer of vitreous enamel material in an intimate mixture with one-half per cent (½%) to fifteen per cent (15%) of a gas-evolving agent, based on the weight of the vitreous enamel material, the gas-evolving agent being selected from the group consisting of cobalt oxide, a mixture of cobalt oxide and nickelous oxide, an alkaline earth carbonate, an alkaline earth sulphate, or combinations thereof, the volume of the fused backing varying between two to eight times its original unfused volume and the specific gravity of the insulating backing varying between one-half and one-eighth of the specific gravity of the unfused vitreous material.

12. A composite article comprising a metal base having permanently united therewith fused cellular vitreous enamel material comprising the fusion product of vitreous enamel material in the presence of a gas-evolving agent, the volume of the fused cellular enamel being from two to eight times its original volume, and the specific gravity of the fused cellular material being between one-eighth and one-half of the specific gravity of the original vitreous enamel material, at least one surface of said article being provided with a series of cup-like depressions greatly increasing its gripping area.

13. The process of producing a composite insulating article having substantial insulating properties, comprising applying to a metal base a layer of a vitreous enamel material having incorporated therein a gas-evolving agent, fusing the resulting vitreous enamel mix to a viscous condition, and trapping the evolved gases in a volume adapted to cause the resulting cooled insulating backing to have a specific gravity of less than one-half of the specific gravity of the unfired vitreous material, and cooling the fired article.

14. The process of producing a composite insulating article having substantial insulating properties, comprising applying to a metal base a layer of a vitreous enamel material having incorporated therein a gas-evolving agent, fusing the resulting vitreous enamel mix to a viscous condition, and trapping the evolved gases in a volume adapted to cause he resulting cooled insulating backing to have a specific gravity varying between one-half and one-eighth of the specific gravity of the original vitreous enamel, and a volume of about two to eight times of the volume of the original vitreous enamel layer.

15. The process of producing a composite insulating article having substantial insulating properties, comprising applying to a metal base a vitreous enamel mix having from one-half per cent (½%) to fifteen per cent (15%) of a gas-evolving agent incorporated therein, fusing the vitreous enamel mix to a viscous condition, and trapping the major portion of the evolved gases in a volume adapted to cause the cooled fused enamel to have a volume of at least about two times the volume of the original vitreous enamel mix, and cooling the fired article.

16. The process of producing a composite insulating article having substantial insulating properties, comprising applying to a metal base a vitreous enamel mix containing at least two and one-half per cent (2½%) of a cobalt oxide adapted to evolve gases during the fusion process, and trapping the major portion of the evolved gases to highly extend the vitreous enamel material, and cooling the fired article.

17. The process of producing a composite insulating article having substantial insulating properties, comprising applying to a metal base a vitreous enamel material having incorporated therein a gas-evolving agent, said enamel mix setting up stresses when fused adapted to sliver off the top layer of the resulting cellular backing, fusing the vitreous enamel mix to a viscous condition and trapping the major portion of the evolved gases in a volume adapted to cause the resulting insulating backing to become highly extended to a mass of great lightness and sliver off the top layer of the backing, and cooling the fired backing.

18. The process of producing a composite article having substantial insulating properties, comprising applying to each side of wire mesh material a layer of vitreous enamel material having incorporated therein a gas-evolving agent, fusing each vitreous enamel layer to a viscous condition and trapping the major portion of the evolved gases in a volume adapted to cause the resulting insulating backing layers to have a volume of at least about two times the volume of the original vitreous enamel material.

KARL TURK.